United States Patent [19]

Mengo

[11] Patent Number: 4,765,420
[45] Date of Patent: Aug. 23, 1988

[54] WEIGH SCALE FOR FISH LANDING DEVICE

[75] Inventor: Alfred Mengo, Kenosha, Wis.

[73] Assignee: Mengo Industries, Inc., Kenosha, Wis.

[21] Appl. No.: 111,235

[22] Filed: Oct. 22, 1987

[51] Int. Cl.$^4$ .................. G01G 19/56; G01G 3/02
[52] U.S. Cl. ................................ 177/149; 177/233; 177/245
[58] Field of Search ................ 177/149, 232, 233, 245

[56] References Cited

U.S. PATENT DOCUMENTS

| | | | |
|---|---|---|---|
| 1,787,352 | 12/1930 | Bensinger | 177/233 X |
| 2,129,469 | 9/1938 | Hedges | 177/232 X |
| 2,446,720 | 8/1948 | Rominski . | |
| 2,488,042 | 11/1949 | Thun | 177/232 |
| 2,586,245 | 2/1952 | McRae . | |
| 2,633,351 | 3/1953 | Fowle | 177/233 X |
| 3,223,189 | 12/1965 | Robbins | 177/149 |
| 3,276,527 | 10/1966 | Nelson | 177/149 |

Primary Examiner—George H. Miller, Jr.
Attorney, Agent, or Firm—Quarles & Brady

[57] ABSTRACT

An improved weigh scale and fish landing device wherein the spring scale can be adjusted or zeroed in a tamper-proof manner. In one embodiment the fish landing device is a fish landing net having an elongate handle. The weigh scale includes a cylinder axially journalled on the handle with the handle extending completely through said cylinder. There is an annular chamber within the cylinder exteriorly of said handle with the annular chamber being closed at one end of said cylinder by a bearing end fixed to said cylinder and fitting closely about said handle while allowing free axial movement of said handle. A coil compression spring is positioned in said chamber about said handle and bearing at one end against said bearing end. A transverse pin is disposed slidably in said chamber extending from said handle and protruding therefrom, the other end of said coil spring bearing against said pin. There are weight calibrations visible on the cylinder adjacent said pin to indicate the weight of the fish when the net is in a lowered position. In a preferred manner one or more spacing elements are placed between the spring and the bearing end to provide the adjustment of the spring.

7 Claims, 1 Drawing Sheet

U.S. Patent        Aug. 23, 1988        4,765,420
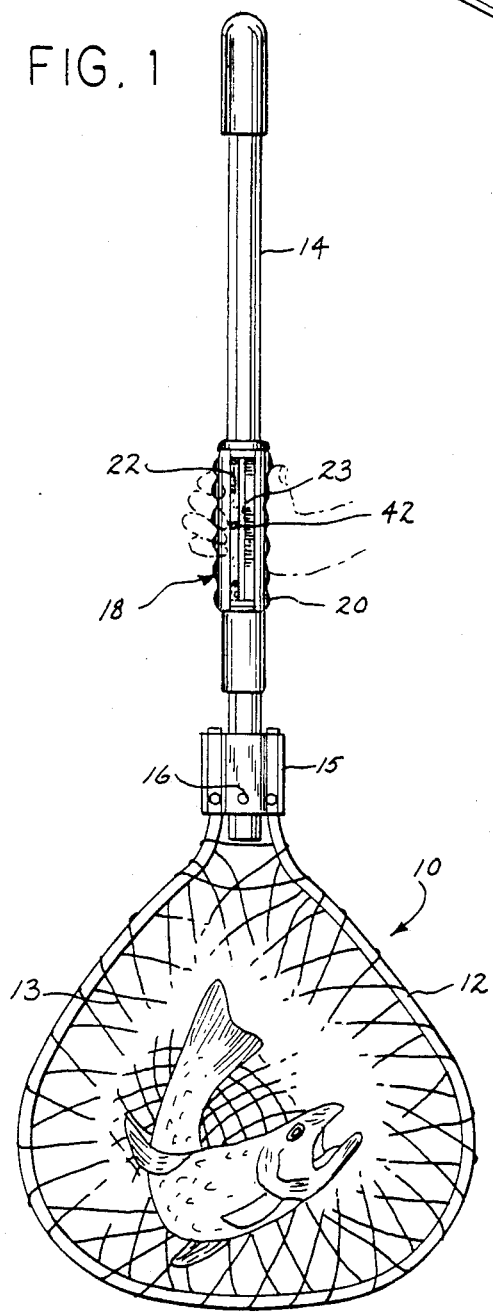
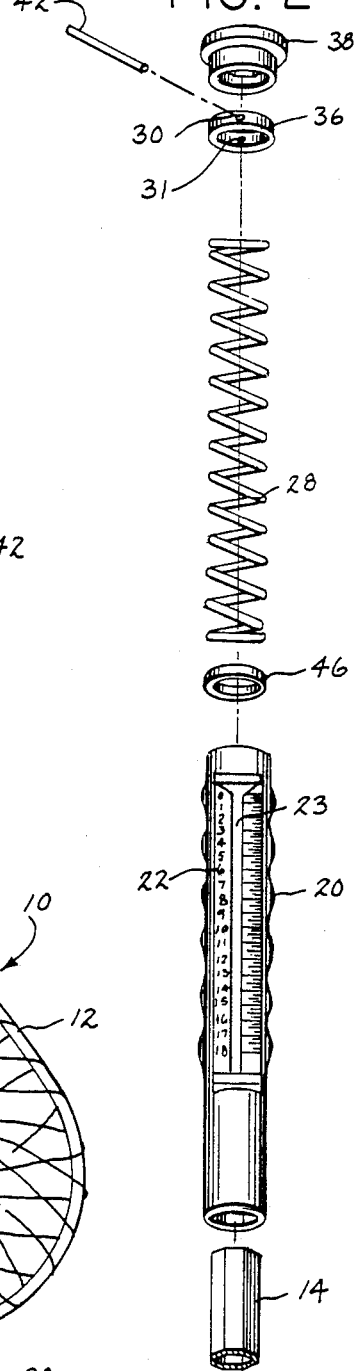
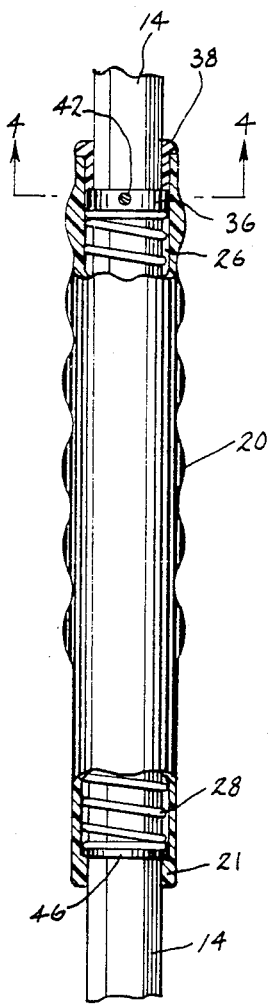
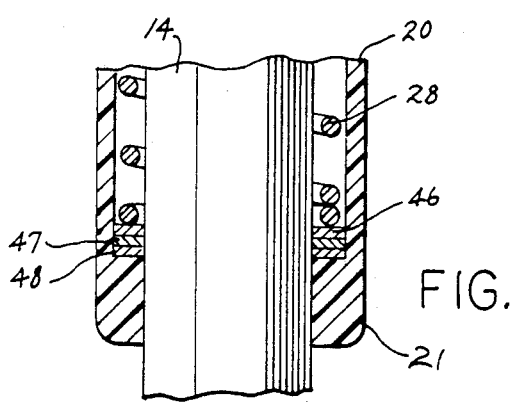
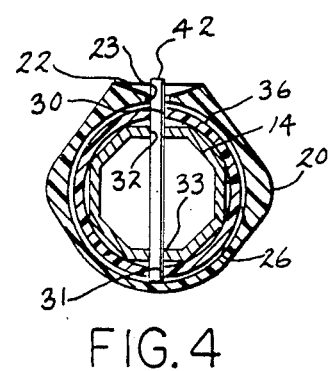

WEIGH SCALE FOR FISH LANDING DEVICE

BACKGROUND OF THE INVENTION

The present invention relates to an improved weigh scale for use in combination with a fish landing device. More particularly, my invention concerns a versatile weigh scale unit journalled about the handle of a fish landing net, wherein an adjustment element is contained in a tamper-proof manner.

Weigh scales for use in combination with fish landing nets are known. For example in U.S. Pat. No. 3,223,189 there is shown a scale with a fish landing net which also has an adjustment feature for "zeroing" the scale device. This is accomplished by means of the threaded end plug 38. An adjustment screw 26 is also disclosed in U.S. Pat. No. 2,446,720 in a gaff weigh hook. In U.S. Pat. No. 2,586,245 adjustment nuts 19 are described for a similar purpose while in U.S. Pat. No. 2,633,351 an adjustment bolt 18 screws into a nut 17 for adjusting a plate 15 in a scale device for fish landing nets.

While the previously indicated patents show spring scale adjustment features for fishing handling apparatus, none show an adjustment feature which is tamper-proof. This is important where accuracy is desired and the "honesty" of the fisherman may be at issue.

It is an advantage of the present invention to provide an improved fish weighing device for a fish landing device.

It is another advantage of the present invention to provide an improved fish weighing device of the foregoing type wherein the weighing device includes a spring member which is adjustable in a tamper-proof manner.

It is another advantage of the present invention to provide a tamper-proof adjustment means for a fish landing net weigh scale which is economical to manufacture.

Other advantages are an improved weigh scale for fish landing devices which is easily assembled and can be retrofitted to the landing net.

SUMMARY OF THE INVENTION

The foregoing advantages are accomplished and the shortcomings of the prior art are overcome by the present weigh scale wherein there is an elongate bar for holding a load to be weighed. A cylinder is axially movably journalled on the bar with the bar extending completely through the cylinder. An annular chamber is defined within the cylinder about the bar. A cylinder coil spring is positioned in the chamber about the bar. A first spring stop is fixed to the cylinder at one end of the spring. A second spring stop is affixed to the bar at the other end of the spring and is axially movable with respect to the cylinder in response to normal urging of the spring. There are spring adjustment means positioned in the chamber in a tamper-proof manner.

In a preferred embodiment there is provided a scale and fish landing net wherein the net has an elongate handle and a cylinder is axially journalled on the handle with the handle extending completely through the cylinder. The annular chamber is defined within the cylinder exteriorly of the handle with the annular chamber being closed at one end of said cylinder by a bearing end fixed to the cylinder and fitting closely about the handle while allowing free axial movement of the handle. A coil compression spring is positioned in the chamber about the handle and bearing at one end against the bearing end. There is a slot in the cylinder extending parallel to the axis thereof. Weight calibrations are disposed on the exterior of the cylinder along the slot. A sleeve is fixedly journalled about the handle at the other end of said spring within the chamber with the sleeve being axially movable with respect to said cylinder. A protrusion extends through the sleeve and into said slot and moving along the slot as the sleeve moves with respect to said cylinder. There is also an annular plug at the end of said cylinder opposite said bearing end, an inner end of the plug contacting the sleeve. One or more spacing elements are positioned between said bearing end and the spring to provide tamper-proof spring adjustment.

BRIEF DESCRIPTION OF THE DRAWING

A better understanding of the present improved weigh scale for fish landing devices will be accomplished by reference to the drawing wherein:

FIG. 1 is a view in front elevation illustrating the improved weigh scale device in the form of a landing net.

FIG. 2 is an assembly view thereof.

FIG. 3 is an enlarged partial view and partially in vertical section showing the assembled weigh scale device.

FIG. 4 is a sectional view taken along line 4—4 of FIG. 3 and

FIG. 5 is a partial and enlarged view of an alternative embodiment of the present weigh scale device.

DESCRIPTION OF THE PREFERRED EMBODIMENT

Proceeding to a detailed description of the present invention, the improved weigh scale for fish landing device generally 10 includes a frame 12 for supporting a net 13. A typical fish is shown positioned in the net. A handle 14 which preferably is of an octagonal cross section is connected to the frame 12 by the yoke 15. This is accomplished by a detent mechanism 16 so that the handle 14 can be employed either with the net 13 or a gaf hook (not shown) which could also be attached by means of the detent 16.

Slidably positioned on the handle 14 is a weigh scale unit generally 18. It will be journalled on the handle 14 and positioned with the upper end thereof approximately midway on the handle as viewed in the FIG. 1 position and with the net 13 positioned downwardly.

Referring specifically to FIGS. 2, 3 and 4, the component parts of the weigh scale 18 are illustrated. It is seen that when the elongated cylinder 20 is placed over the handle 14 there is a compartment 26 therebetween. This compartment accommodates the compression spring 28 therein. The elongated cylinder 20 is formed with the stop section 21 which will serve as a retention means for the spacing element 46. This in turn is contacted by the spring 28. At the other end of the cylinder 20 there is the sleeve and the pin 42 for maintaining the collar in contact with the spring 28. There is also a retainer cap 38.

The improvement to which this invention is specifically directed is the adjustment feature for the spring tensioning so that irrespective of the weight of the handle 14 as well as the frame 12 and the yoke 15 the spring tensioning can compensate and have the scale unit adjusted and "zeroed." To do this, the spacing element such as 46 is utilized. It will be appreciated if it is placed against the stop 21 in the cylinder 20, it is in this manner not accessible to the user. This is an advantage in that it is then placed in a tamper-proof manner.

FIG. 5 represents an alternative embodiment in which additional spacing elements 47 and 48 can be added for adjustment purposes.

Assembly and Operation

A better understanding of the weigh scale adjustment feature of this invention will be appreciated by a description of the assembly and operation of the improved weigh scale for fish landing device 10. The handle 14 will be of a standard type except in this case it is octagonal for strength purposes. The only difference between it and any other handle of this type is that a hole will be drilled therethrough as indicated at 32 and 33 in FIG. 4. The cylinder 20 is positioned over the handle 14 and the spacing element 46 positioned on the stop o bearing end 21. The spring 28 placed between the cylinder 20 and the handle 14 and in the chamber 26 thus over the spacing element 46. The sleeve 36 is positioned over the spring 28 and is aligned so that the openings 30 and 31 are aligned with the openings 32 and 33 through the handle 14. The pin 42 is inserted through the openings 32 and 33 of the handle 14 as well as the openings 30 and 31 of the sleeve 36. The positioning of the pin with respect to the clyinder 20 is through the slot 23. The pin is designed to extend a distance outwardly from the handle and into the slot 23 to serve as a weight indicator means. The last step in the assembly is the positioning of the retainer cap or plug 38 over the sleeve 36. One of the inner portions of the plug contacts the sleeve 36 and another inner portion contacts the cylinder 20. The fish landing net is now ready for usage.

When it is desired to weigh a fish such as indicated in FIG. 1 the fish landing net 10 will be positioned in the manner shown in FIG. 1. As the elongated cylinder 20 is free to move over the handle 14 the weight in the net 13 will cause the spring 28 to be compressed when the fish landing net is held by a hand as represented in FIG. 1. The more the weight of the fish the more the pin 42 will effect a compression of the spring 28 through the sleeve 36 which is fastened to the handle. It should be further noted that although the pin 42 is secured to handle 14 as well as to the sleeve 36, it is free to ride in the slot 23. However, as it extends out from the slot 23, it is captured by the ends thereof.

It will be appreciated that as the weights of the handle and the frame 12 of the various sizes of fish landing nets increases this will also effect a downward force on the spring 28. Adjustment therefore needs to be made so that the weigh scale device is properly zeroed. This is accomplished by adding the spacing element 46 as indicated in FIG. 3. For additional adjustment, additional spacing elements 47 and 48 can be added. An important feature of the spacing elements 46-48 is that they not only adjust and compensate for the various weights of fishing nets, they are placed in a position such that they are tamper-proof. This is important for various reasons and especially in the instance where a fisherman might be tempted to alter the weight of his catch. The spacing elements allow for a single weigh scale unit to be produced for various weights of fishing nets. This is a cost saving feature.

While the improved weigh scale device of this invention has been shown in conjunction with the fishing net, it should be noted that the yoke 15 has a detent 16. This permits detachment of the net 13 and the frame 12 from the handle 14 with replacement of a gaf hook. The weigh scale unit 18 would be readily usable with the gaf hook unit as well.

While not particularly shown in conjunction with the handle 14, if desired, a tape measure can be applied to the side surface of the handle 14. This is particularly advantageous when an octagonal handle is employed as a flat surface is presented for the tape measure to be secured.

All of the components of the landing net and weigh scale unit can be fabricated from readily available materials. The handle portion 14 and the frame 12 are fabricated from aluminum thus making the unit lightweight yet rugged. The spring is a standard metal compression spring and the cylinder 20 as well as the sleeve 36 and the retainer cap 38 are composed of a polyethylene resinous material. The spacing elements 46-48 are made of metal. If desired other suitable materials would be substituted and still obtain the advantages of the present improved weigh scale device.

The foregoing invention can now be practiced by those skilled in the art. Such skilled persons will know that the invention is not necessarily restricted to the particular embodiments presented herein. The scope of the invention is to be defined by terms of the following claims as given meaning by the preceding description.

I claim:

1. A scale and fish landing net which can afford a tamper-proof adjustment of a weigh scale spring comprising:

a net having an elongate handle;

a cylinder axially journalled on said handle with said handle extending completely through said cylinder;

a chamber being defined within said cylinder exteriorly of said handle, said chamber being open at one end and closed at another end of said cylinder by a bearing end fixed to said cylinder and fitting closely about said handle while allowing free axial movement of said handle;

a coil compression spring positioned in said chamber about said handle and bearing at one end against said bearing end;

a slot in said cylinder extending parallel to the axis thereof;

weight calibrations on the exterior of said cylinder along said slot, a sleeve fixedly journalled about said handle at the other end of said spring within said chamber, said sleeve being axially movable with respect to said cylinder, a protrusion on said sleeve extending through said sleeve and into said slot and moving along said slot as said sleeve moves with respect to said cylinder;

an annular plug at the open end of said cylinder opposite said bearing end, an inner end of said plug contacting said sleeve; and at least one spacing element positioned between said bearing end and said spring in a manner to provide a tamper-proof adjustment of said spring.

2. The scale and fish landing net as defined in claim 1 wherein there is present a multiplicity of spacing elements.

3. The scale and fish landing net as defined in claim 1 wherein said chamber is annular and said spacing elements are annular and defined by smooth wall surfaces and the absence of threads.

4. In a scale and fish landing net which can afford a tamper-proof adjustment of a weigh scale spring, said scale and fish landing net having an elongate handle, a cylinder axially journalled on said handle with said handle extending completely through said cylinder, a chamber being defined within said cylinder exteriorly of said handle, said chamber being open at one end and closed at another end of said cylinder by a bearing end fixed to said cylinder and fitting closely about said handle while allowing free axial movement of said handle, a coil compression spring positioned in said chamber about said handle and bearing at one end against said bearing end, a transverse pin disposed slidably in said chamber extending from said handle and protruding therefrom, the other end of said coil spring exerting a force against said pin, weight calibrations visible on said cylinder adjacent said pin, the improvement comprising:

spring adjustment means positioned in said chamber between said spring and said bearing and in a tamper-proof manner.

5. The improved scale and fish landing net as defined in claim 4 wherein said spring adjustment means are defined by at least one spacing element.

6. The improved scale and fish landing net as defined in claim 5 wherein there is present a multiplicity of spacing elements.

7. The improved scale and fish landing net as defined in claim 4 wherein said chamber is annular and said spacing elements are annular and defined by smooth surfaces and the absence of threads.

* * * * *